United States Patent
Young

(10) Patent No.: US 10,296,180 B1
(45) Date of Patent: May 21, 2019

(54) GEOSPATIAL ANALYTIC REPORTING AND MONITORING

(71) Applicant: Securus Technologies, Inc., Dallas, TX (US)

(72) Inventor: Jeffrey T. Young, Glenn Heights, TX (US)

(73) Assignee: Securus Technologies, Inc., Carrollton, TX (US)

(*) Notice: Subject to any disclaimer, the term of this patent is extended or adjusted under 35 U.S.C. 154(b) by 1138 days.

(21) Appl. No.: 14/134,683

(22) Filed: Dec. 19, 2013

(51) Int. Cl.
| | |
|---|---|
| *G06F 3/048* | (2013.01) |
| *G06F 3/0484* | (2013.01) |
| *H04W 4/021* | (2018.01) |
| *H04H 20/55* | (2008.01) |
| *H04H 20/53* | (2008.01) |
| *G06F 11/30* | (2006.01) |

(52) U.S. Cl.
CPC ........ *G06F 3/0484* (2013.01); *G06F 11/3013* (2013.01); *H04H 20/53* (2013.01); *H04H 20/55* (2013.01); *H04W 4/021* (2013.01)

(58) Field of Classification Search
CPC .......... G01S 19/39; G01S 19/48; G01S 19/49; G01S 5/0294; G05B 23/0272; G05D 1/0027; G05D 1/0287; G06Q 10/0639; G06Q 10/08; H04M 1/72569; H04W 4/021; G06F 11/3013; G06F 11/30; H04H 20/53; H04H 20/55; H04L 12/2823
See application file for complete search history.

(56) References Cited

U.S. PATENT DOCUMENTS

| | | | |
|---|---|---|---|
| 2004/0029564 A1* | 2/2004 | Hodge | H04M 1/67 455/411 |
| 2009/0307255 A1* | 12/2009 | Park | G06Q 10/10 |
| 2011/0088000 A1* | 4/2011 | Mackay | G06T 19/00 715/853 |

* cited by examiner

*Primary Examiner* — Jeffrey A Gaffin
*Assistant Examiner* — Ayesha Huertas Torres
(74) *Attorney, Agent, or Firm* — Fogarty LLP

(57) ABSTRACT

Embodiments of systems and methods for analyzing, monitoring and recording communications with a controlled-environment facility are described. In one embodiment, a floor plan for a controlled-environment facility is displayed to a user. The floor plan shows a number of areas representing locations within the controlled-environment facility. The areas displayed on the floor plan may represent locations within the controlled-environment facility based upon a physical or logical relationship between the areas. One or more floor plan areas are highlighted on the display. The highlighting is associated with communication service activity in the controlled-environment facility. For example, the communication service activity may correspond to an operational status of communication devices, call volume on communication devices, called numbers, caller identities, or real-time or historical calling activity.

20 Claims, 6 Drawing Sheets

GEOSPATIAL ANALYTIC REPORTING AND MONITORING

BACKGROUND

Providers of communications systems in controlled-environment facilities must configure, maintain, repair, and replace many communication devices that are installed throughout the facility. Service providers and facility administrators do not have the capability to look at all of these devices at one time. Instead, the service provider must identify particular telephones and devices of interest so that the information can be collected about that telephone or device.

Additionally, to analyze communication system usage, the service provider must collect and correlate individual call detail records to develop text-based usage reports.

SUMMARY

Embodiments of systems and methods for analyzing, monitoring and recording communications with a controlled-environment facility are described. In one embodiment, a floor plan for a controlled-environment facility is displayed to a user. The floor plan shows a number of areas representing locations within the controlled-environment facility. The areas displayed on the floor plan may represent locations within the controlled-environment facility based upon a physical or logical relationship between the areas. One or more floor plan areas are highlighted on the display. The highlighting is associated with communication service activity in the controlled-environment facility. For example, the communication service activity may correspond to an operational status of communication devices, call volume on communication devices, called numbers, caller identities, or real-time or historical calling activity.

A user may identify a selected controlled-environment facility. A top-level floor plan for the controlled-environment facility is retrieved. The user may then select a location within the controlled-environment facility. In response, a next-level floor plan that corresponds to the selected controlled-environment facility location is retrieved.

In some embodiments, a series of floor-plan images that correspond to a selected time window may be displayed. One or more floor plan areas may be highlighted on each floor-plan image on the display. Call activity trends may be identified from the highlighted floor plan areas on the display. In response to the communication service activity, a communication in the controlled-environment facility may be recorded or monitored. The communication service activity in the controlled-environment facility is analyzed and communication activity analytics are provided to the user.

BRIEF DESCRIPTION OF THE DRAWINGS

Figure 1:
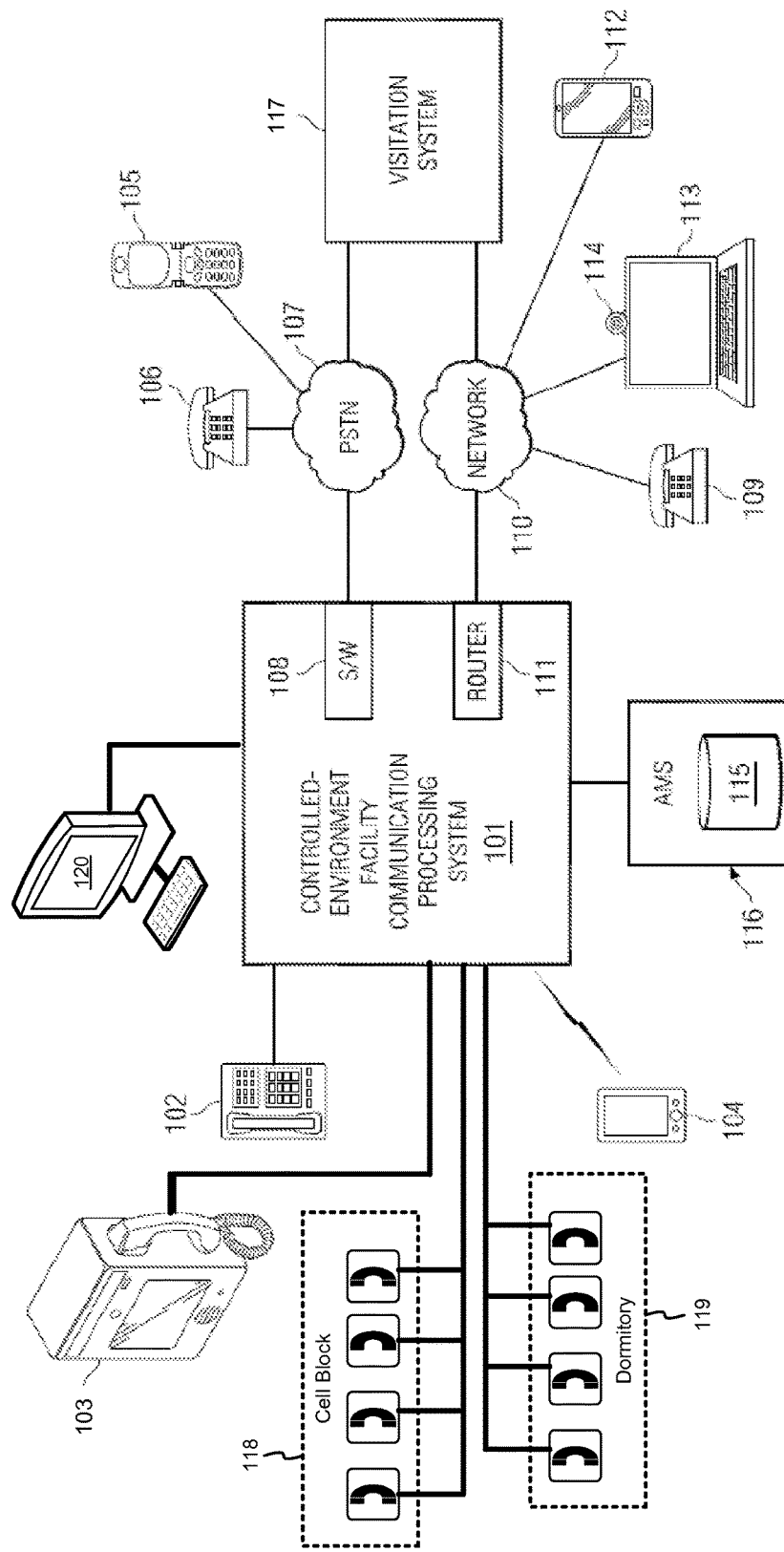

Having thus described the invention in general terms, reference will now be made to the accompanying drawings, which are not necessarily drawn to scale, and wherein:

FIG. 1 is a high-level block diagram of a communications system that facilitates communications between an inmate and other parties.

Figure 2:
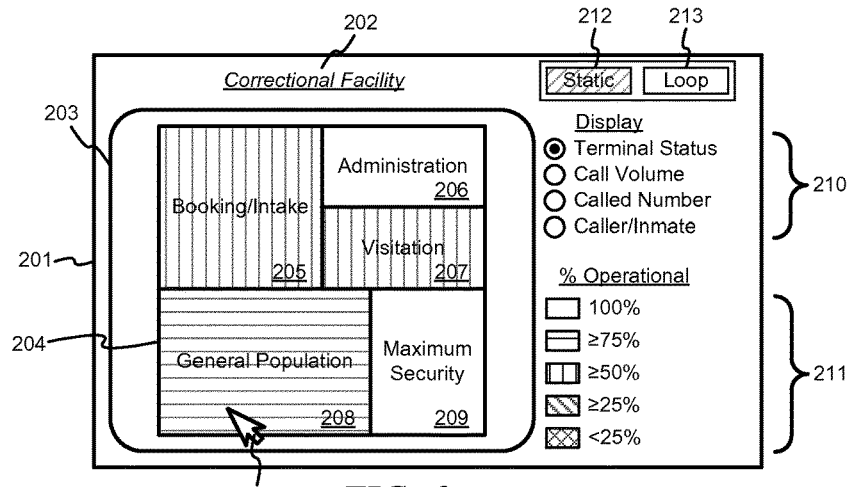

FIG. 2 is a block diagram illustrating a terminal status option on a user interface for a communication device monitoring and reporting application according to one embodiment.

Figure 3:
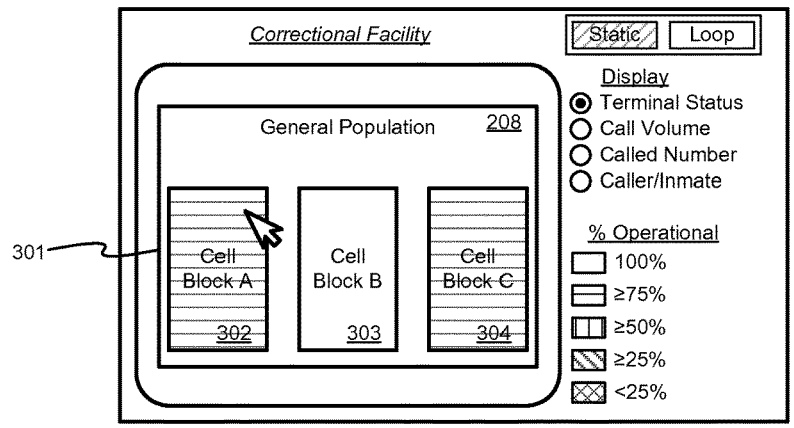

FIG. 3 is a block diagram illustrating a user interface after drilling down one level according to one embodiment.

Figure 4:
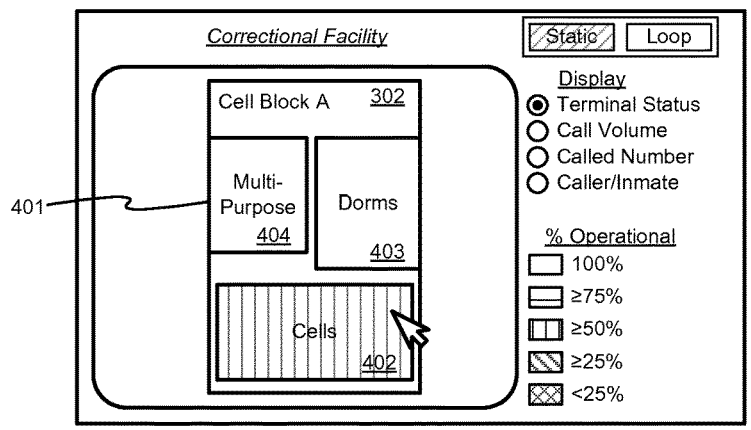

FIG. 4 is a block diagram illustrating a user interface after drilling down one more level according to one embodiment.

Figure 5:
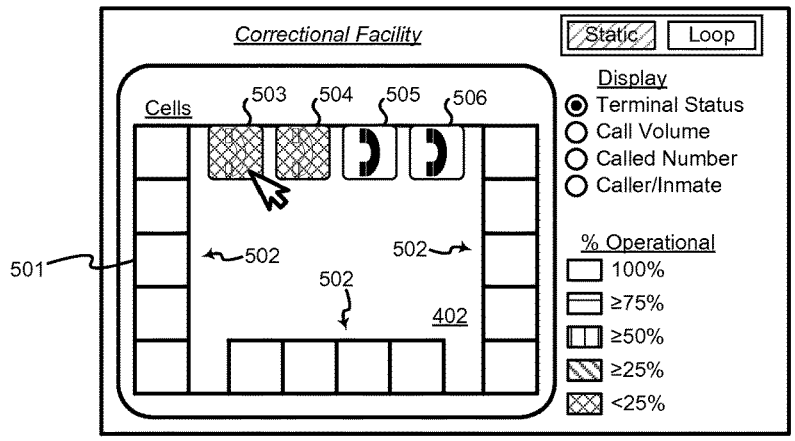

FIG. 5 is a block diagram illustrating a user interface for after drilling down more one level according to one embodiment.

Figure 6:
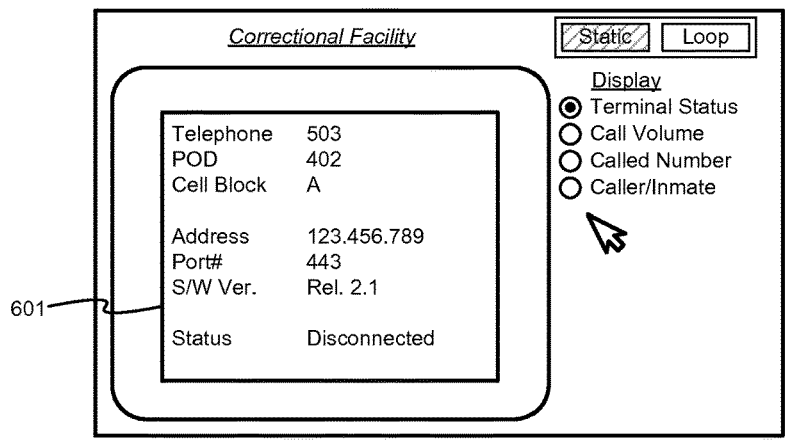

FIG. 6 is a block diagram illustrating an operational status of a plurality of individual telephones n according to one embodiment.

Figure 7:
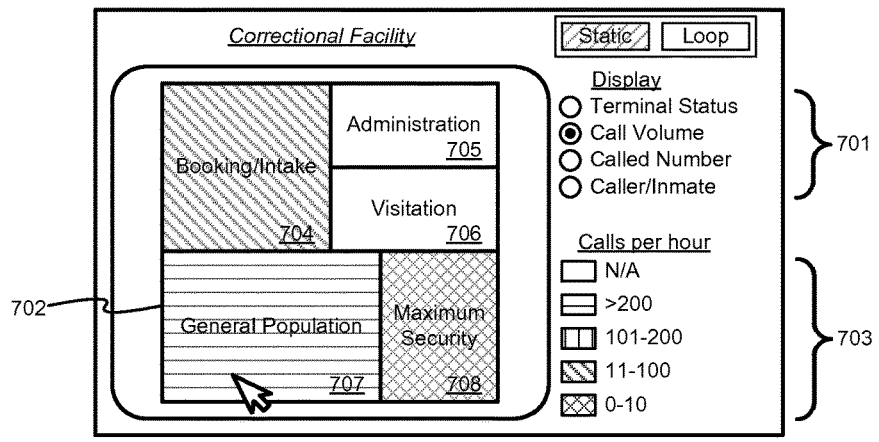

FIG. 7 is a block diagram illustrating a call volume feature on a user interface for a communication device monitoring and reporting application according to one embodiment.

Figure 8:
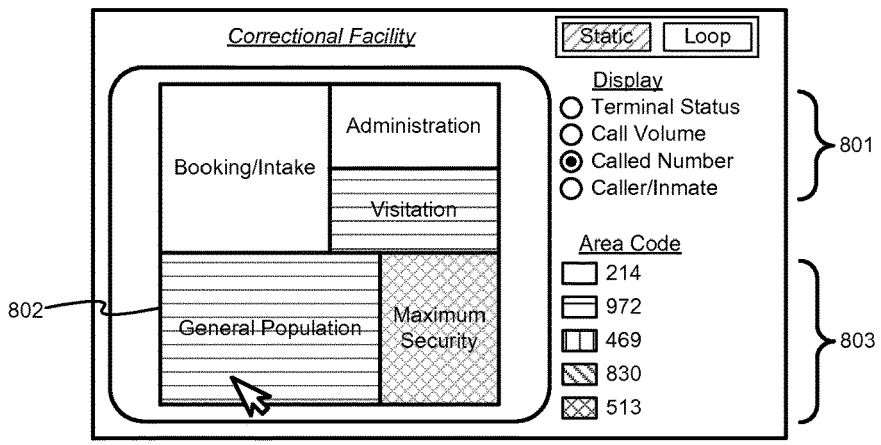

FIG. 8 is a block diagram illustrating a called number feature on a user interface for a communication device monitoring and reporting application according to one embodiment.

Figure 9:
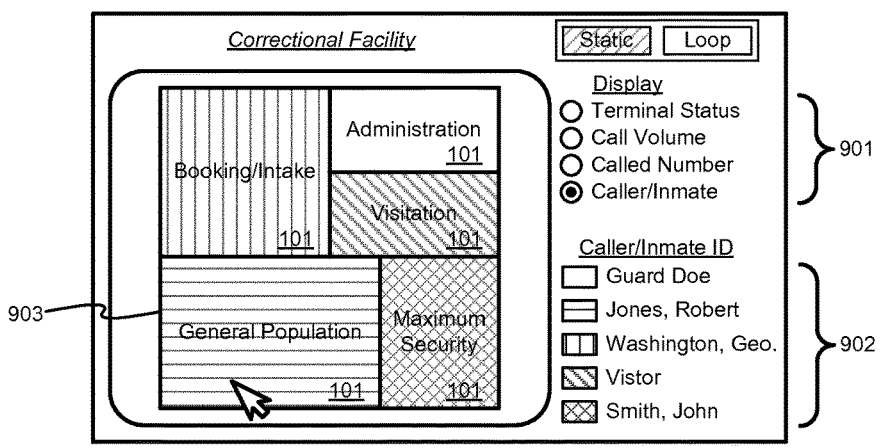

FIG. 9 is a block diagram illustrating a caller/inmate identity feature on a user interface for a communication device monitoring and reporting application according to one embodiment.

Figure 10:
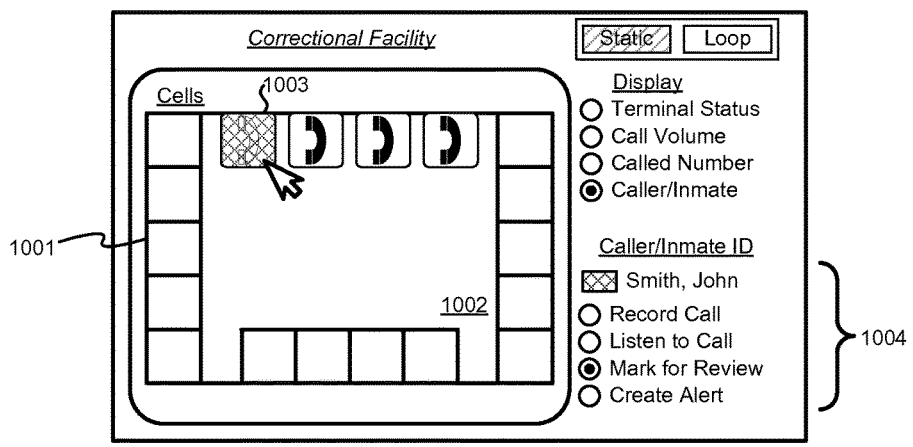

FIG. 10 is a block diagram illustrating a caller/inmate identity feature after drilling down one level on a user interface for a communication device monitoring and reporting application according to one embodiment.

Figure 11:
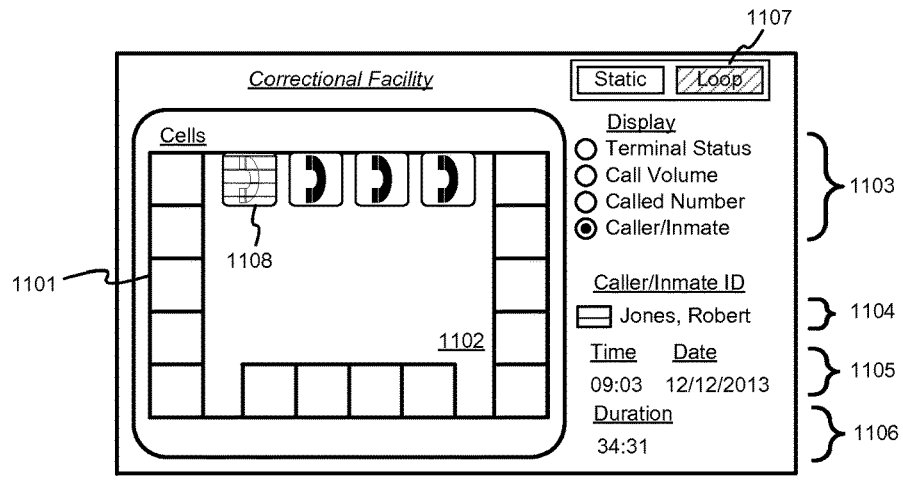
Figure 12:
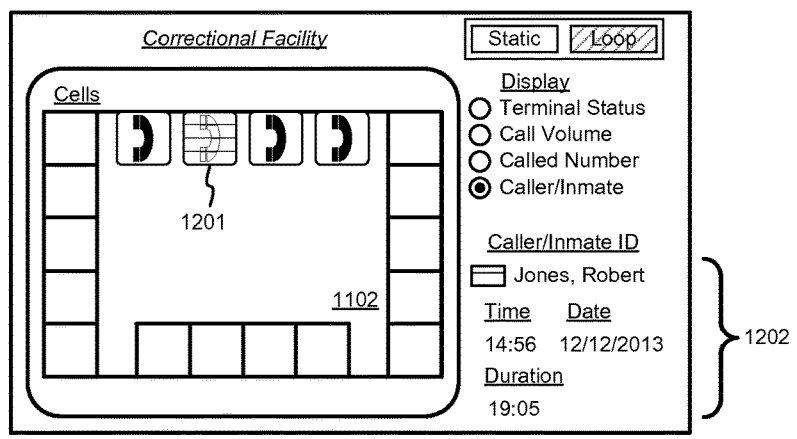
Figure 13:
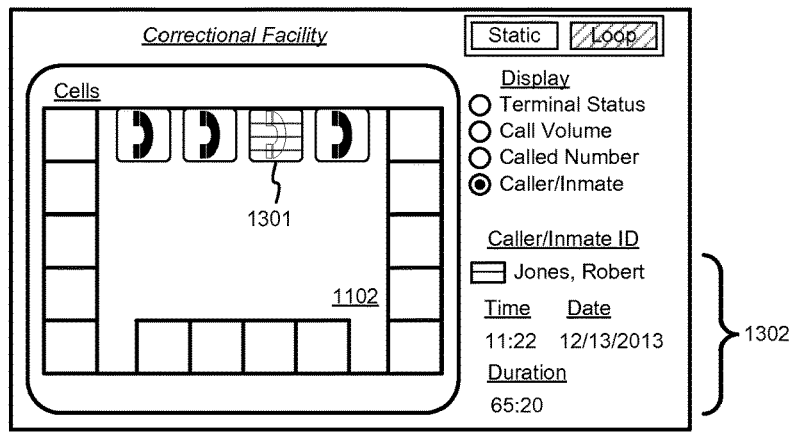

FIGS. 11-13 are block diagrams illustrating a looping feature on a user interface for a communication device monitoring and reporting application according to one embodiment.

Figure 14:
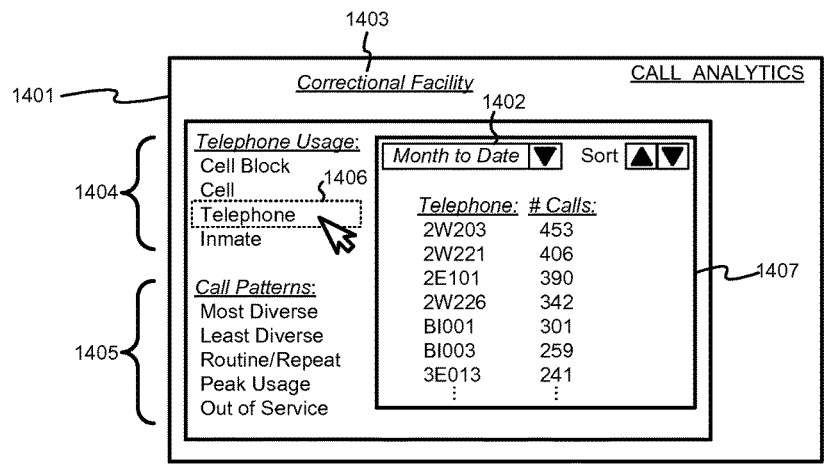

FIG. 14 is an example user interface for providing analytical information to the user.

Figure 15:
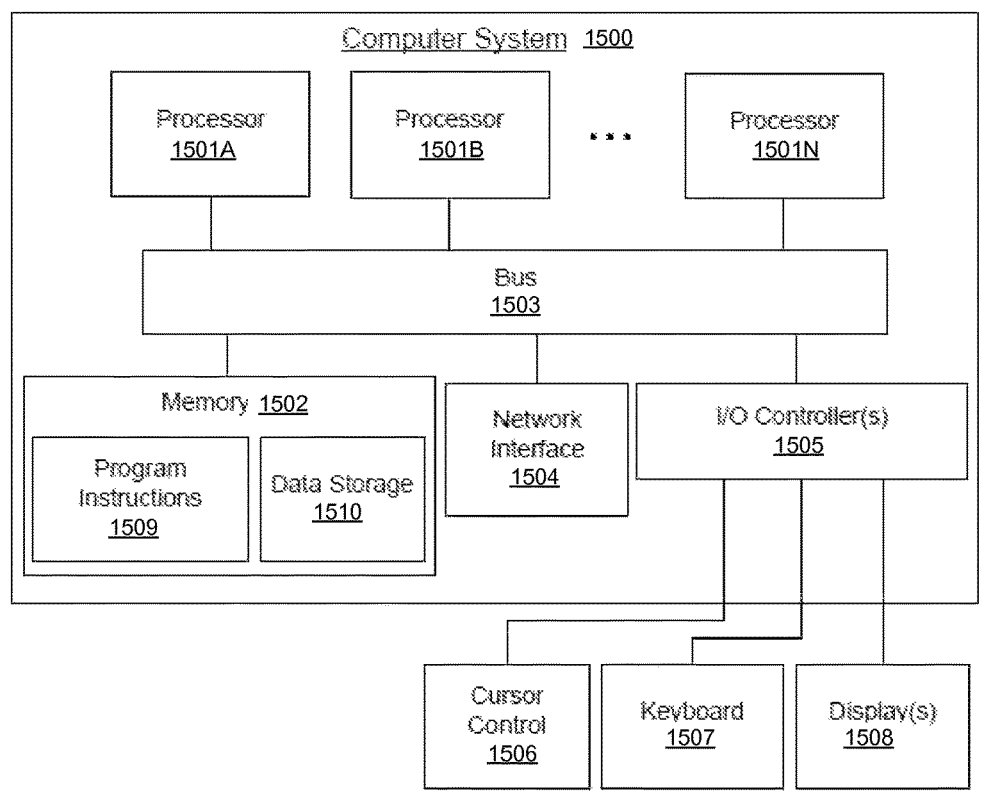

FIG. 15 is a schematic block diagram illustrating one embodiment of a computer system configured for use according to the present embodiments.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

Generally speaking, the various techniques described herein may find applicability in a wide variety of controlled-environment facilities (as well as outside of controlled-environment facilities). Examples of controlled-environment facilities may include correctional institutions or facilities (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation clinics, such as drug and alcohol rehabilitation facilities, etc.), restricted living quarters (e.g., hotels, resorts, camps, dormitories, barracks, etc.), and the like.

For convenience of explanation, various examples discussed herein are presented in the context of correctional facilities. For instance, in some of the embodiments discussed below, a controlled-environment facility may be referred to as a jail or prison, and its residents may be referred to as residents, arrestees, detainees, or inmates. It should be understood, however, that the systems and methods described herein may be similarly applicable to other types of controlled-environment facilities and their respective residents (e.g., a hospital and its patients).

The present embodiments describe methods and systems for monitoring social networking of targets associated with a controlled-environment facility. In an embodiment, the method includes determining a social media target associated with a person having association with a controlled-environment facility, monitoring the social media target for an activity event, and providing information to an administrator of the controlled-environment facility in response to the activity event.

Beneficially, such embodiments may provide administrators of controlled-environment facilities and/or criminal investigators with information needed to determine whether an inmate is accessing an unauthorized social networking platform. Such embodiments may additionally facilitate identification of unauthorized communications and/or possession of contraband communications devices.

Turning now to FIG. 1, a block diagram of an illustrative environment where geospatial reporting, analysis, and monitoring may be employed is depicted according to some embodiments. As shown, communication processing system 101 may provide telephone services, videoconferencing, online chat, and other communication services to a controlled-environment facility. For example, in some cases, communication system 101 may be co-located with a controlled-environment facility. Alternatively, communication system 101 may be centrally or remotely located with respect to one or more controlled-environment facilities and/or may provide communication services to multiple controlled-environment facilities. More generally, however, it should be noted that communication processing system 101 may assume a variety of forms, and may be configured to serve a variety of facilities and/or users, whether within or outside of a controlled-environment facility.

In the context of a correctional facility, for instance, inmates may use telephones 102 to access certain communication services. The telephones may include both approved and unapproved (e.g., contraband) pay telephones, landline telephones, cellular telephones, wireless devices, personal digital assistants (PDA), etc. In some facilities, inmates may also use a personal computer wireless device 104 to access such services. Inmates may also have access to video visitation terminals, kiosks, laptop or notebook computers, tablet computers, or other terminals that provide communication services. It will be understood that the term "telephone" is generally used herein to simplify the description and is intended to encompass any communication device that provides audio, video, and/or written communications, including, but not limited to, such video visitation terminals, kiosks, personal computer, laptop or notebook computers, tablet computers, or other terminals. An inmate may initiate telephone services by lifting the receiver on telephone 102, at which time the inmate may be prompted to provide a personal identification number (PIN), other identifying information or biometrics. An interactive voice response (IVR) unit (not shown) may generate and play prompts or other messages to inmates on devices 102 and/or 104.

Under the control of communication processing system 101, devices 102 and 104 may be capable of connecting to a non-resident's (i.e., a person not committed to a controlled-environment facility) device 105 or telephone 106 across a publicly switched telephone network (PSTN) 107. For example, device 105 may be a mobile, cellular, or wireless telephone, whereas telephone 106 may be located at a non-resident's home, inmate visitation center, etc. Switch 108 in communication processing system 101 may be used to connect calls across PSTN 107. Additionally or alternatively, the non-resident may be at telephone 109 or device 112, which is on an Integrated Services Digital Network (ISDN), Voice-over-IP (VoIP), or packet data network 110, such as, for example the Internet. Router 111 of communication system 101 is used to route data packets associated with a call connection to destination telephone 109 or device 112.

A video visitation device 103 may have video conferencing capabilities to enable inmates to participate in video visitation sessions with non-residents of the correctional facility via video call, secure online chat, etc. For example, a non-resident party may have a personal or laptop computer 113 with camera 114 (or a cell phone, tablet computer, etc.). Additionally or alternatively, device 112 may have an integrated camera and display (e.g., a smart phone, tablet, etc.). A network connection between the parties may be established and supported by an organization or commercial service that provides computer services and software for use in telecommunications and/or VOIP, such as SKYPE®. Additionally or alternatively, the correctional facility and/or the destination may use videoconferencing equipment compatible with ITU H.323, H.320, H.264, and/or V.80, or other suitable standards. Generally speaking, each video visitation device 103 may be disposed in a visitation room, in a pod, cell, etc.

In addition to providing certain visitation and communication operations, communication processing system 101 may attempt to ensure that an inmate's calls, video conferences, online chats, etc. are performed only with non-residents whose identities, devices, email addresses, phone numbers, etc. are listed in that inmate's Personal Allowed Number (PAN) list or Pre-Approved Contact (PAC) list. Each inmate's PAN list may be stored, for example, in database 115 maintained by Administration and Management System (AMS) 116. In addition to PAC list(s), AMS 116 may also store inmate or resident profile data (RPD), as well as visitation rules applicable to each inmate.

Visitation system 117 may be configured to provide, schedule, and manage visitation services to residents and non-residents of a controlled-environment facility. To that end, visitation system 117 may be coupled to PSTN 107 and/or network 110 in a manner similar to communication processing system 101 by also including one or more gateways, switches and/or routers (not shown). Accordingly, visitation system 117 may be configured to communicate with one or more residents of the controlled-environment facility via devices 102-104 and with one or more non-residents via devices 105, 106, 109, 112, and/or 113. Although visitation system 117 is shown in FIG. 1 as being remotely located with respect to communication processing system 101 and the controlled-environment facility, in other cases visitation system 117 may be co-located with the facility and/or integrated within system 101.

In some implementations, communication system 101 may be configured to perform monitoring operations configured to monitor and/or record telephone calls and/or video visitations (e.g., as electronic call record files). In scenarios where communication system 101 is located within the controlled-environment facility, it may have direct access to AMS 116. In other embodiments, however, communication system 101 may be located remotely with respect to the controlled-environment facility, and access to AMS 116 may be obtained via a computer network such as, for example, network 110.

In controlled-environment facilities, inmates are housed in units, such as cell blocks 118, dormitories 119, pods, etc. Communication processing system 101 provides communication services to inmates in these units via telephones, kiosks, video visitation devices, computers, etc. that are distributed throughout the facility. The communication devices must be located where the inmates live so that they can make calls without having to be moved within the facility to access the telephones, etc.

A service provider must configure, maintain, repair, and replace the communication devices supported by communication processing system 101. Those devices may be distributed throughout a large facility in multiple cell blocks on different floors each having different security levels. Additionally, the service provider may support multiple facilities within one or more jurisdictions across the country. The service provider, facility administrator, or investigator may access communication processing system 101 using an operations and maintenance terminal 120.

FIG. 2 is a block diagram illustrating a user interface 201 for a geospatial reporting, analysis, and monitoring application for communication devices according to one embodiment. The reporting, analysis, and monitoring application may be accessed via operations and maintenance terminal 120, for example. A user selects a jurisdiction, department, correctional system or facility 202 to be analyzed. User interface 201 provides a display area 203 that shows a floor plan 204 for the selected facility. The floor plan 204 may represent a physical or logical layout of the facility. For example, the floor plan 204 may be an architectural schematic of the facility that shows the exact or approximate physical layout of the facility. Alternatively, floor plan 204 may be a logical representation of the facility that illustrates relevant sections of the facility without concern for actual physical groupings or positioning of the sections.

As illustrated by the example floor plan 204 in FIG. 2, the facility may include a booking/intake area 205, administration area 206, visitation area 207, general population section 208, and maximum security area 209. The locations illustrated on the floor plan 204 may include the entire facility or may be restricted to only those locations that include telephones or communications devices. For example, if communication processing system 101 does not provide communication service for the telephones in administration area 206 (i.e., where the guard's telephone system is separate from the inmate telephone system), then administration area 206 may be optionally included or excluded from floor plan 204.

The user interface provides an interactive floor plan navigation. The user may select what type of information 210 to display in relation to floor plan 204. For example, information associated with terminal status, call volume, called numbers, or caller/inmate details may be overlaid on the floor plan 204. FIG. 2 illustrates an embodiment in which Terminal Status 210 has been selected. An associated key 211 is displayed to indicate what information is being displayed on floor plan 204. For example, each area of the floor plan 204 may be highlighted with a different color, pattern, image, icon, or other designation to show an operational status level. The monitoring and reporting application shown in FIG. 2 indicates that at least 50% of the telephones in the booking/intake area 205 are operational and at least 75% of the telephones in the general population area 208 and visitation area 207 are operational. All of the telephones in the other areas—administration 206 and maximum security 209—are operational.

The user may select a static view option 212 to display floor plan 204 at a particular time, such as the current time or any selected past time. Alternatively, the user may choose a loop option 213 to display changes in floor plan 204 over time as further illustrated below in FIGS. 11-13.

The user may select options on user interface 201 with a cursor 214 that is controlled by a pointing device, such as mouse or touchpad. If the user "clicks" the cursor on general population section 208, for example, the display will change to the view illustrated in FIG. 3.

FIG. 3 is a block diagram illustrating user interface 201 when the general population segment of the floor plan 204 has been selected. A floor plan 301 showing details for the general population section has been displayed. Floor plan 301 indicates that general population area 208 is divided—physically or logically—into three areas designated as cell blocks A-C 302-304. Floor plan 301 also shows the operational status for terminals in each cell block. Floor plan 301 indicates operational status levels with the color, pattern, image, icon, or other highlighting designations as used for floor plan 204 in FIG. 2. Alternatively, a different highlighting scheme may be used on each level. Floor plan 301 is highlighted to indicate that the telephones in cell blocks A and C 302, 304 are at least 75% operational.

FIG. 4 is a block diagram illustrating user interface 201 when the cell block A 302 segment of the floor plan 301 has been selected. A floor plan 401 showing details for the cell block A 302 has been displayed. Floor plan 401 indicates that cell block A 302 is divided—physically or logically—into areas designated as cells 402, dormitory 403, and multi-purpose room 404. Floor plan 401 is highlighted to indicate that the telephones in cell area 402 are at least 50% operational.

FIG. 5 is a block diagram illustrating user interface 201 when cell area 402 of the floor plan 401 has been selected. Floor plan 501, which shows details for cell area 402, has now been displayed. Floor plan 501 indicates that cell area 402 includes a number of individual cells 502 and four telephones 503-506. Floor plan 501 is highlighted to indicate that the telephones 503 and 504 are out of order and telephones 505 and 506 are operational.

FIG. 6 is a block diagram illustrating user interface 201 when telephone 503 in the floor plan 501 has been selected. Telephone details 601 provide the user with specific information about the selected telephone 503, such as a location, address, port, software version, connection status, etc.

As illustrated in FIGS. 2-6, the user may drill down into selected areas of the facility to identify which areas and which specific telephones are having problems. This allows the user to identify particular telephones that need to be repaired, the source of telephone failures, and other information.

Although FIGS. 2-6 illustrate an example of drilling down within an individual correctional facility, it will be understood that the present invention may be used to analyze telephone usage in multiple facilities. For example, instead of showing a floor map of just one facility, the display may instead provide a map displaying all the correctional facilities within a particular geographic region (e.g., a county, state, or federal system), within a given jurisdiction (e.g., a sheriff's department or department of corrections), or managed by a selected jail management company. Such maps may start at a national level showing telephone use for selected facilities across the country. The user may then drill down to specific regions, facilities, cell blocks, cells, telephones, etc.

FIG. 7 is a block diagram illustrating the user interface when a Call Volume option 701 has been selected. This option displays a floor plan 702 that is highlighted to show a number of calls per hour. The key 703 indicates how to interpret each highlighted section. In other embodiments, the call volume may be displayed in terms of minutes, hours, days, weeks, etc., as desired by the user. General population area 707 has the highest call volume followed by booking/intake area 704. Administration area 705 and visitation area 706 not monitored in one embodiment, but may indicate call volumes in other embodiments. Maximum security area 708 has few, if any, calls.

The call volume may represent only inbound calls, only outbound calls, or both inbound and outbound calls. In other embodiments, the user may narrow the call volume by caller, such as showing call volume for inmates, guards, staff, visitors, friends/family, etc. The user may drill down into the sections shown in floor plan 701 to identify the call volume for particular cell blocks, cells, devices and/or telephones.

FIG. 8 is a block diagram illustrating the user interface when a Called Number option 801 has been selected. This option displays a floor plan 802 that is highlighted to show the most-called area code in each segment of the facility. The key 803 indicates how to interpret each highlighted section, such as which area code is called. In other embodiments, the floor plan 802 displays a currently called telephone number, a most-called exchange, or a most-called telephone number for each section.

FIG. 9 is a block diagram illustrating the user interface when a Caller/Inmate identity option 901 has been selected. This option displays a list 902 of callers, who may be inmates, guards, staff, or visitors, for example. This option may show only outbound, only inbound, or both inbound and outbound callers. The list of callers 902 may be populated by the user to track where specific callers/inmates are making calls. Alternatively, list of callers 902 may indicate the last caller for each area shown on floor plan 903.

FIG. 10 is a block diagram illustrating an alternative user interface when a Caller/Inmate identity option 901 has been selected and the user has drilled down into a particular cell 1002 on floor map 1001. Telephone 1003 is highlighted to indicate who is or was making a call on that particular device. For example, telephone 1003 is highlighted with the color or pattern assigned to inmate John Smith to indicate that he is currently using that telephone or was using telephone 1003 at another selected time. Telephone 1003 may be highlighted to show only outbound, only inbound, or both inbound and outbound callers.

In other embodiments, the user may select one or more options 1004 for a particular telephone, call, or caller. The user may record the call for future analysis. The user may also listen to the call. If the display is showing current calls, then the user can listen to the call "live" in real time. If the display is showing historical telephone usage, then the user may choose to listen to a recording of a past call. The user may mark a call for later review instead of listening to each call as they occur. For example, the user may mark one or more calls for review by another investigator. For calls that are of particular interest, the user may create an alert, for example, to notify another investigator about a call involving a particular inmate, caller, called party, subject, or location.

The displays illustrated in FIGS. 2-10 may represent the current use of telephones in the correctional facility. Alternatively, the displayed floor maps may correspond to a prior time selected by the user, which would allow the user to analyze historical use of the correctional facility's telephones.

FIG. 11 is a block diagram illustrating a user interface display 1101 when the user has drilled down to a particular cell block 1102. The user has selected (1103) to display the identity of the callers/inmates using the telephones in cell block 1102. The user has also selected to track a particular caller in section 1104. Display 1101 indicates a call time and date 1105. This time/date 1105 may be the start time for a last call. Other call information, such as call duration 1106, may be included in the display. The user may select "Loop" option 1107 to show calls made over time starting with a call the selected inmate made on telephone 1108.

FIG. 12 shows the next call made by the selected caller. Telephone 1201 has been highlighted to show where the inmate made the call. The details 1202 for this call are shown in the display.

FIG. 13 shows the next call made by the selected caller. The inmate made a call on telephone 1301, which has been highlighted. The details 1302 for this call are shown in the display.

The user may select a particular window of time (e.g., by selecting start and end times of interest) to be used when displaying the "looping" call details. The user interface displays a continuous sequence of telephone calls made by the selected inmate during the window. This display shows periods of calls and the telephone used interspersed with periods of no call periods.

The looping feature may be used with other displays in addition to the example illustrated in FIGS. 11-13. For example, the looping feature may be selected on the display shown in FIG. 2. The display would then show a continuous sequence of images showing the terminal status for each area of the facility for a selected window of time. The user would be able to identify which areas in the facility are "hot" (i.e., observe which cells, units, or telephones are used most often) at a particular time or all the time. Similarly, the user can identify "cold" areas or telephones that are used infrequently. This gives the user the capability to identify trends from logical groups, sites, or customers. For example, investigators may be interested in which telephones are used by a particular inmate or group of inmates. Business managers may be interested in identifying which cell blocks, units, or other areas of the facility have the highest and lowest telephone usage. Low-usage areas may be targeted by marketing activity to increase telephone usage (and revenue) in those areas.

The geospatial monitoring and reporting application has the capability to support multiple levels of groups, multiple floors of buildings, multiple buildings of sites, and multiple sites of customers. The application also has the capability to associate phones, terminals, ports, phone groups, switches, or other communication mechanisms to these groups. The application may visually report real-time call traffic from these logical groups using alerts, colors, charts, data streams, or other reporting means.

The application may monitor real-time traffic (live monitoring) from these logical groups. Alternatively, the user may use the application to analyze past communication traffic and device use. This gives the application the capability to provide all reporting and monitoring as real-time or as a selected moment in time.

FIG. 14 is an example user interface 1401 for providing analytical information to the user of a geospatial reporting, analysis, and monitoring application. The application may be configured to recognize patterns in communication system behavior and inmate usage and provide analytics to the user. For example, the user may select a particular period of time 1402 to be analyzed. The user may select a start time and an end time to designate the period of analysis. Alternatively, the user may select a predefined period, such as an hour, day, week, month, year, or other interval. The user may also select a prison system, correctional facility, cell block, or other unit 1403 to be analyzed.

The user may choose from various options for call analytics. In one embodiment, telephone usage information 1404 may be selected. For example, the user may request the system to analyze telephone usage for a selected cell block, cell, telephone, or inmate within the facility. The user may also choose from various call pattern options for call analytics. For example, the user may request information showing call patterns such as most or least diverse usage (e.g., telephone with the highest number of different callers, or inmate who used the highest number of different telephones), call routines and repetitive call patterns (e.g., showing trends of telephones used or number called by an inmate), peak usage (e.g., highest usage times or telephones), out of service (e.g., identifying times and/or locations of telephones that do not work). When a user selects a particular option, such as telephone usage option 1406, detailed information is presented, such a ranked list of telephones and the number of calls made on each telephone in the facility.

FIG. 15 is a schematic block diagram illustrating one embodiment of a computer system 1500 configured for use according to the present embodiments. In one embodiment, communication processing system 101, user interface 201, and/or a geospatial reporting and monitoring application may be implemented on a computer system similar to the computer system 1500. Additionally, the computer system 1500 may be used to implement a video visitation device 103, kiosk, telephone, and operations and maintenance terminal 120. In various embodiments, computer system 1500 may be a server, a mainframe computer system, a workstation, a network computer, a desktop computer, a laptop, or the like.

As illustrated, computer system 1500 includes one or more processors 1501A-N coupled to a system memory 1502 via bus 1503. Computer system 1500 further includes network interface 1504 coupled to bus 1503, and input/output (I/O) controller(s) 1505, coupled to devices such as cursor control device 1506, keyboard 1507, and display(s) 1508. In some embodiments, a given entity may be implemented using a single instance of computer system 1500, while in other embodiments multiple such systems, or multiple nodes making up computer system 1500, may be configured to host different portions or instances of embodiments.

In various embodiments, computer system 1500 may be a single-processor system including one processor 1501A, or a multi-processor system including two or more processors 1501A-N (e.g., two, four, eight, or another suitable number). Processor(s) 1501A-N may be any processor capable of executing program instructions. For example, in various embodiments, processor(s) 1501A-N may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processor(s) 1501A-N may commonly, but not necessarily, implement the same ISA. Also, in some embodiments, at least one processor(s) 1501A-N may be a graphics processing unit (GPU) or other dedicated graphics-rendering device.

System memory 1502 may be configured to store program instructions and/or data accessible by processor(s) 1501A-N. In various embodiments, system memory 1502 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described above, may be stored within system memory 1502 as program instructions 1509 and data storage 1510, respectively. In other embodiments, program instructions and/or data may be received, sent or stored upon different types of computer-accessible media or on similar media separate from system memory 1502 or computer system 1500. Generally speaking, a computer-accessible medium may include any tangible, non-transitory storage media or memory media such as electronic, magnetic, or optical media—e.g., disk or CD/DVD-ROM coupled to computer system 1500 via bus 1503, or non-volatile memory storage (e.g., "flash" memory)

The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 1503 may be configured to coordinate I/O traffic between processor 1501, system memory 1502, and any peripheral devices including network interface 1504 or other peripheral interfaces, connected via I/O controller(s) 1505. In some embodiments, bus 1503 may perform any necessary protocol, timing or other data transformations to convert data signals from one component (e.g., system memory 1502) into a format suitable for use by another component (e.g., processor(s) 1501A-N). In some embodiments, bus 1503 may include support for devices attached through various types of peripheral buses, such as a variant of the Peripheral Component Interconnect (PCI) bus standard or the Universal Serial Bus (USB) standard, for example. In some embodiments, the operations of bus 1503 may be split into two or more separate components, such as a north bridge and a south bridge, for example. In addition, in some embodiments some or all of the operations of bus 1503, such as an interface to system memory 1502, may be incorporated directly into processor(s) 1501A-N.

Network interface 1504 may be configured to allow data to be exchanged between computer system 1500 and other devices, such as social media platforms, for example. In various embodiments, network interface 1504 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

I/O controller(s) 1505 may, in some embodiments, enable connection to one or more display terminals, keyboards, keypads, touch screens, scanning devices, voice or optical recognition devices, or any other devices suitable for entering or retrieving data by one or more computer system 1500. Multiple input/output devices may be present in computer system 1500 or may be distributed on various nodes of computer system 1500. In some embodiments, similar I/O devices may be separate from computer system 1500 and may interact with computer system 1500 through a wired or wireless connection, such as over network interface 1504.

Memory 1502 may include program instructions 1509, configured to implement certain embodiments described herein, and data storage 1510, comprising various data accessible by program instructions 1509. In an embodiment, program instructions 1509 may include software elements of embodiments illustrated in FIGS. 2-14. For example, program instructions 1509 may be implemented in various embodiments using any desired programming language, scripting language, or combination of programming languages and/or scripting languages. Data storage 1510 may include data that may be used in these embodiments such as, for example, data displayed and analyzed in user interface 201. In other embodiments, other or different software elements and data may be included.

A person of ordinary skill in the art will appreciate that computer system 1500 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other computer system configurations.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A method comprising:
    displaying a floor plan for at least a portion of a controlled-environment facility, the floor plan comprising a plurality of floor plan areas representing physical areas within the controlled-environment facility, wherein the physical areas include communication devices for use by residents of the controlled-environment facility in participating in visitation sessions with non-residents, and wherein the displayed floor plan areas include a plurality of device indicators, each representing one of the communication devices;
    monitoring the visitation sessions conducted using the plurality of communication devices located within the displayed areas of the controlled-environment facility; and
    in response to selection of a displayed device indicator, reporting monitored aspects of the visitation sessions conducted using the communication device corresponding to the selected device indicator.

2. The method of claim 1, wherein the monitored activity comprises an operational status of the plurality of communication devices.

3. The method of claim 1, wherein the monitored activity comprises a call volume generated by the plurality of communication devices.

4. The method of claim 1, wherein the monitored activity comprises called number information for calls conducted via the plurality of communication devices.

5. The method of claim 1, wherein the monitored activity comprises caller identity information for calls conducted via the plurality of communication devices.

6. The method of claim 1, wherein displaying a floor plan further comprises:
    receiving a user selection identifying the controlled-environment facility; and
    retrieving a top-level floor plan for the controlled-environment facility.

7. The method of claim 6, further comprising:
    receiving a user selection of a controlled-environment facility location; and
    retrieving a next-level floor plan for the controlled-environment facility, the next-level floor plan corresponding to an additional floor plan for the selected controlled-environment facility location.

8. The method of claim 1, wherein displaying a floor plan further comprises:
    displaying a series of floor-plan images corresponding to a selected time window; and
    highlighting one or more floor plan areas on each of the series of floor-plan image on the display.

9. The method of claim 1, further comprising:
    displaying the areas based upon a physical relationship between the areas.

10. The method of claim 1, further comprising:
    displaying the areas based upon a logical relationship between the areas.

11. The method of claim 1, wherein the monitored activity corresponds to ongoing calling activity within each of the displayed areas.

12. The method of claim 1, wherein the monitored activity corresponds to activity for the plurality of communication devices occurring during a selected past time.

13. The method of claim 1, further comprising:
    identifying call activity trends by the plurality of communication devices from the highlighted floor plan areas on the display.

14. The method of claim 1, further comprising:
    in response to the monitored activity, recording a communication conducted via a communication device of the plurality of communication devices.

15. The method of claim 1, further comprising:
    highlighting one or more of the displayed device indicators to indicate the communication devices used by a resident for visitation sessions within a specified period of time.

16. The method of claim 15, further comprising:
    reporting monitored aspects of the visitation sessions by the resident during the specified time window.

17. A system comprising a data processing device configured to:
- receive a user selection identifying a controlled-environment facility;
- retrieve a top-level floor plan for at least a portion of the controlled-environment facility from a memory device;
- display the top-level-floor plan on a user display, the floor plan comprising a plurality of floor plan areas representing physical areas within the controlled-environment facility, wherein the physical areas include communication devices for use by residents of the controlled-environment facility in participating in visitation sessions with non-residents, and wherein the displayed floor plan areas include a plurality of device indicators, each representing one of the communication devices;
- monitoring the visitation sessions conducted using the communication devices located within the displayed floor plan areas of the controlled-environment facility; and
- in response to selection of a displayed device indicator, reporting monitored aspects of the visitation sessions conducted using the communication device corresponding to the selected device indicator.

18. The system of claim 17, wherein the data processing device is further configured to:
- receive a user selection of a controlled-environment facility;
- retrieve a next-level floor plan for the selected controlled-environment facility, the next-level floor plan corresponding to an additional floor plan for the selected controlled-environment facility;
- display the next-level floor plan on a user display; and
- highlight one or more floor plan areas on the next-level display, the highlighting indicating the monitored activity of the plurality of communication devices within the floor plan areas of in the controlled-environment facility.

19. The system of claim 17, wherein the data processing device is further configured to:
- record a communication conducted via a communication device of the plurality of communication devices in response to the monitored activity in the controlled-environment facility.

20. The system of claim 17, wherein the data processing device is further configured to:
- analyze the monitored activity in the controlled-environment facility; and
- provide monitored activity analytics to the user.

* * * * *